(12) United States Patent
Nelson et al.

(10) Patent No.: US 7,076,462 B1
(45) Date of Patent: Jul. 11, 2006

(54) SYSTEM AND METHOD FOR ELECTRONIC LOAN APPLICATION AND FOR CORRECTING CREDIT REPORT ERRORS

(76) Inventors: Joseph E. Nelson, 3515 N. 25th St., Arlington, VA (US) 22207; Kevin M. Darcey, 11740 Saddle Crescent Cir., Oakton, VA (US) 22124

( * ) Notice: Subject to any disclaimer, the term of this patent is extended or adjusted under 35 U.S.C. 154(b) by 408 days.

(21) Appl. No.: 09/517,419

(22) Filed: Mar. 2, 2000

(51) Int. Cl.
*G06F 17/60* (2006.01)

(52) U.S. Cl. .......................................... 705/38; 705/38
(58) Field of Classification Search ................... 705/38
See application file for complete search history.

(56) References Cited

U.S. PATENT DOCUMENTS

| | | | |
|---|---|---|---|
| 5,611,052 A * | 3/1997 | Dykstra et al. | 705/38 |
| 5,774,883 A * | 6/1998 | Andersen et al. | 705/38 |
| 5,940,812 A * | 8/1999 | Tengel et al. | 705/38 |
| 2003/0081824 A1 * | 5/2003 | Mennie et al. | 382/135 |

OTHER PUBLICATIONS

Novastar Financial, Inc. Announces On-Line Automated Loan Origination and Approval as Fannie Mae Seller/Servicer. Jun. 16, 1999.*
http://www.ique.com/software.htm (1998 Archive).*
http://www.e-novastar.com/.*
FCIC: How to Dispute Credit Report Errors (Federal Trade Commision) Mar. 1999.*

* cited by examiner

*Primary Examiner*—Frantzy Poinvil
*Assistant Examiner*—Siegfried E. Chencinski
(74) *Attorney, Agent, or Firm*—Roberts, Mardula & Wertheim, LLC

(57) ABSTRACT

A system and method for the correction of credit information and for submitting loan documents. A borrower and/or loan facilitator completes loan documents in an electronic fashion and submits the information over the internet to the systems server of the present invention. The server then acquires credit information and parses the information into a database for subsequent manipulation by the user in any desired fashion. The system also allows for electronic versions of supporting documentation to be assembled electronically with the loan documents so that the loan pack can be a complete electronic version with supporting documents, for presentations to a plurality of lenders. The lenders then respond to the server with their offers and the server presents the offers to the borrower. Thus by bidding on the borrower's loan requirements the lenders provide the most cost effective package to the borrower.

18 Claims, 3 Drawing Sheets

SYSTEM AND METHOD FOR ELECTRONIC LOAN APPLICATION AND FOR CORRECTING CREDIT REPORT ERRORS

FIELD OF THE INVENTION

This invention relates generally to correcting credit report errors and making loan applications. More particularly the present invention is a system and method for correcting credit report errors in conjunction with loan application and approval.

BACKGROUND OF THE INVENTION

Applying for a loan can be traumatic. This is especially so when applying for larger loans, such as mortgage loans. The consumer must first collect a wide variety of information, make that information available to any person that has an interest in helping a borrower obtain funds for any reason. Such persons are loan originator or brokers but may also be car dealers, retail establishments and the like (hereinafter collectively "loan facilitators"). Typically, the broker has the consumer sign a permission form allowing the broker to obtain a credit report. Once the credit report is obtained from any one or all of three credit bureaus, that credit report is viewed by the broker and sometimes made available to the consumer for review.

The difficulty with credit reports is that form and format of these reports may be incomprehensible to the normal human being. They are difficult to read, and frequently contain adverse and erroneous information. Any such adverse or erroneous information can affect the ability of the consumer to obtain a loan in the first place.

If a credit report has negative or adverse and erroneous information, the loan facilitator may request information from the consumer regarding such adverse or erroneous information. If such information cannot be eliminated from the credit report in a meaningful fashion, the consumer may have their loan rejected by the broker, or may be forced to go to a lender who deals with individuals with less than perfect credit.

When dealing with a lender of this type, typically the "deal" that is offered to a consumer is not as advantageous as one that would be offered if the consumer had good credit.

A second difficulty with this process for situations where credit is not perfect, is that the consumer or indeed the broker himself may not know all of the sources or all of the lenders who would be willing to make loans to individuals with less than perfect credit. By simply going to a single lender, the best deal that the consumer might otherwise obtain will not be available.

If the consumer determines that there is adverse or erroneous information on the credit history, the consumer is then faced with the difficulty of how to correct the adverse or erroneous information. Most consumers do not know the rules and regulations associated with correcting adverse or erroneous information on a credit report. Therefore, any system that can assist a consumer in this fashion will be welcome indeed.

However, in the event that certain adverse credit that is reported is in fact correct, consumers still deserve the best possible deal on loan letters to be offered. Therefore, any system that helps in obtaining the best deal possible would also provide a major benefit to consumers.

What would therefore be useful is any system and method that allows a consumer to receive credit information in a readable and user-friendly fashion. Such a system would allow a consumer to correct any adverse or erroneous information in a manner that adheres to the rules for making such corrections. Further, such a system would allow a consumer to receive a variety of offers, all of which are designed to have a competitive environment for obtaining the best offer of a loan for a consumer.

SUMMARY OF THE INVENTION

As noted above, it is an object of the present invention to allow credit to be corrected in a simple, easy to understand, and efficient fashion.

It is a further objective of the present invention to allow credit errors to be corrected over a network such as the world wide web.

It is yet another objective of the present invention to allow customer based responses to be submitted which will effect credit corrections.

It is yet another objective of the present invention to present to the customer a series of templates offering options for explaining and/or submitting mitigating circumstances for correcting credit report errors.

It is yet another objective of the present invention to provide for a comprehensive, unified and user-friendly presentation to a customer of the results from the various credit bureaus.

It is yet another objective of the present invention to translate information from credit bureaus into common terminology that an average customer can understand.

It is a further objective of the present invention to provide for credit correction services which are free of charge to the customer.

It is yet another objective of the present invention to provide for loan facilitators to have "less than perfect" credit customers be serviced for credit correction services.

It is yet another objective of the present invention to provide for a fully automated system that allows for a complete loan to be underwritten online.

It is yet another objective of the present invention to provide an interactive means for the customer to sort and view their credit data in multiple formats.

It is still another objective of the present invention to present customer credit data in a flexible way by allowing the credit data to be sorted using user-definable parameters.

These and other objectives of the present invention will become apparent to those skilled in the art from a review of the specification that follows.

The present invention is a web-based credit correction service that is offered to individuals and is further coupled with loan facilitator to allow for the credit of the borrower to be corrected. For purposes of this application, the term "borrower" and "customer" are synonymous and represent the individual who desires to borrow money.

The process begins with the borrower contacting a loan facilitator, either in person or online to complete the necessary forms for borrowing money. At the point of loan origination, it may become apparent to the loan facilitator that the borrower has less than perfect credit. During the course of the loan origination, the borrower typically fills out a form that allows the retrieval of a credit report from one or more of various credit bureaus as noted earlier.

The credit bureaus report consumer credit information in various forms. While they generally provide the same type of information on each borrower, that information is presented in a variety of different formats, some of which may be virtually incomprehensible to the borrower. At the present time, two of the three primary credit bureaus have their information available online to those authorized users. It is anticipated that the third credit bureau, Equifax, will eventually have its credit reports available online as well. While at the present time the present invention refers to the three principle credit bureaus, this is not meant as a limitation. For example, it is anticipated that other credit bureaus may be authorized in the future to provide information. Further, other types of credit sources such as Dunn and Bradstreet and others are also available and may have information that is relevant to the decision of the lender to lend money to a borrower. Thus while information from credit bureaus is discussed below, this should be read broadly as to include information from any credit repository such as bad check databases and the like.

The loan facilitator, upon obtaining the appropriate forms and permissions and, after analysis of the borrowers credit, may determine that this loan cannot be underwritten by the primary lenders with whom the loan facilitator is associated. In this case, secondary lenders may be indicated as the appropriate lenders who lend money to those with less than perfect credit at rates that appropriately reflect the risk that may be associated with such borrowers.

The loan facilitator sends the less-than-perfect credit borrower's applications to the credit correction subsystem of the present invention. The credit correction subsystem is an integral part of the overall loan origination and approval as noted above, but constitutes its own separate process and also constitutes a separate entry point into the loan process that is available to borrowers.

The credit correction subsystem receives the borrower's credit application and authorization to obtain credit information and submits the credit report request to the appropriate reporting agency. This report may be submitted to all of the agencies and other credit databases. Thereafter, the credit report is sent back to the credit correction subsystem which receives the information and parses the data in the reports. The server of the present invention parses all of the data, including every trade line on a consumers credit report. In this fashion, the system is not limited to only adverse information since errors may also occur on tradeline information with no adverse information. For example, an account with Sears is showing on the consumers credit report with a balance of $4,500.00 and a monthly payment of $250.00 and no late payments ever. This item is not adverse but the consumer claims never to have had a Sears Charge card. If the system only included adverse items, then a consumer would not be able to dispute an account that is not adverse but is not accurate. Thus the credit correction subsystem parses every line in the credit report which reflects an account with a creditor and allows the borrower to identify adverse information as well as erroneous information such as an entry for an account which never belonged to the borrower or an account which has been closed. The parsed data from each tradeline is used to populate an interactive configurable electronic form that is submitted to the borrower.

The borrower is then given the option of disputing any of the credit references noted on the credit form. In this instance, a series of options is presented to the borrower. Those options are to dispute a particular item of credit, or to leave that particular credit item alone. If the user decides to dispute the item of credit, the user clicks an appropriate option and advises the credit correction subsystem of the borrower's intent to dispute the credit item. Thereafter, a new series of screens is presented to the borrower to dispute the particular account.

The dispute account screen allows the users to select a series of predetermined options such as "not my account," "never paid late," "paid in full," or other options. In addition, the user can simply present a challenge to the credit bureau to prove that the information is accurate or complete.

Other options for response to a particular credit items can be added by the credit correction subsystem as needed and subsequently presented to the user.

Once the borrower decides to challenge the credit item and completes the appropriate form, the user is then asked if the user desires to create a letter to go to the credit bureau via electronic or traditional mail to dispute the account using the rationale presented in the "dispute account" screen. It should also be noted that the user is given the option to present certain other text reasons which may not be present on the dispute account screen.

Once this information is completed, individualized letters are sent to the credit bureaus presenting the reasons noted by the borrower and disputing the particular credit item. By this process, at least some of the credit errors can be cleared from the borrower's record. In so doing, this will raise the credit level of the borrower and potentially allow the loan to be underwritten by primary lenders and/or secondary lenders.

As noted earlier, the actual service for credit correction will be offered to borrowers for free. Revenue for use of the present invention will occur in two fashions. First, revenue can be derived from loan facilitators who, through use of the credit correction subsystem of the present invention will have the ability to have more loans underwritten by lenders. This allows for more fees to the loan facilitator which can be shared with the organization running the credit correction subsystem. In addition, consumers will be charged for retrieval, translation, and reformatting of the credit reports from the various credit agencies. This is a valuable service that allows reports from the various credit bureaus to be comprehensible to the borrower, and thereby allows the borrower to make a more informed judgment as to what items of credit to dispute.

The credit correction subsystem of the present invention also serves some additional purposes that ultimately lead to favorable terms for a loan that is desired by a borrower. In this process the borrower fills out the normal loan application and submits the application to the credit correction subsystem. The credit correction subsystem checks to determine if there are any reports on file, and if not retrieves reports from the appropriate credit bureau. If any credit corrections are necessary, the credit correction subsystem provides the appropriate functionality to the borrower to correct the credit as noted earlier.

As part of the credit correction subsystem, the organization that runs the subsystem receives and registers information from a number of retail lenders who are interested in lending money to individuals who submit applications to the credit correction subsystem. A separate portion of the credit subsystem website is reserved for lenders to periodically review the applications of potential borrowers who desire to borrow money. Information is presented both on the web page reserved for lenders as well as being sent directly to those lenders who register with the credit correction subsystem. The lenders view the summary of information on the potential borrower, either on the website or in the electronic message that is sent to the lender. If the lender decides to view the application a request is sent to the credit correction subsystem and a copy of the application and the credit report is sent to the lender.

At this juncture, the credit correction subsystem derives revenue by charging the lender for each application and credit report that the lender wishes to review.

The lender reviews the credit application and corrected credit report and accepts the application and enters the appropriate terms that the lender deems to be reasonable for the credit rating for the particular borrower in question. The lender then sends an "accept with terms" message to the web server of the credit correction subsystem and this particular loan is added to a queue of loans and offers that can be reviewed by the borrower. Once a number of loan bids are received, preferably five, the loan bids are presented to the borrower for selection. The borrower can then indicate electronically by clicking on the appropriate loan desired with the results being forwarded to the website.

BRIEF DESCRIPTION OF FIGURES

FIG. 4 illustrates the login screen for access to the consumer's full credit report.

FIG. 5 illustrates the summary screen for the consumer's entire credit report, and a browser menu.

FIG. 6 illustrates the summary screen for an individual creditor's report displayed in both Narrative and Traditional formats, and a browser menu.

FIG. 7 illustrates a sample generated letter.

DETAILED DESCRIPTION OF THE INVENTION

As noted above, the present invention is a system and method for borrowers to submit loan documents to acquire a loan. Further the system allows the borrower to correct erroneous or adverse credit information that may be present in a credit bureau report as part of the overall loan process. Part of the process is to acquire information from the credit bureaus.

It is important to note that the customer (borrower) can complete the required forms electronically or the loan facilitator, with the appropriate authorization and with the borrower present can complete the required forms.

As part of the electronic submission of documents to lenders, the present invention also allows for electronic images of documents submitted by the borrower to be attached to the other documents that are submitted to lenders over the Internet. In practice, this works in two ways. First, the loan facilitator completes the appropriate information electronically with the server of the present invention. Further, the broker scans any documents that are submitted by the potential borrower, such as W-2 forms, tax forms, real estate and other asset forms, and the like. This is not meant, however, as a limitation since the facilitator can always fax or mail the supporting documents to the entity that administers the server of the present invention. These documents are scanned and sent as electronic images attached to the electronic submission to the server of the present invention. Thereafter, the server submits the appropriate loan documents for the borrower together with the electronic image of those documents so that the lender can see an image of the documents that are used to support the information that is presented to the lender.

Later, as part of the approval process, the original documents can be produced to the approving lender. However, during the electronic brokering of the loan, all activities occur in an electronic fashion.

Figure 1:
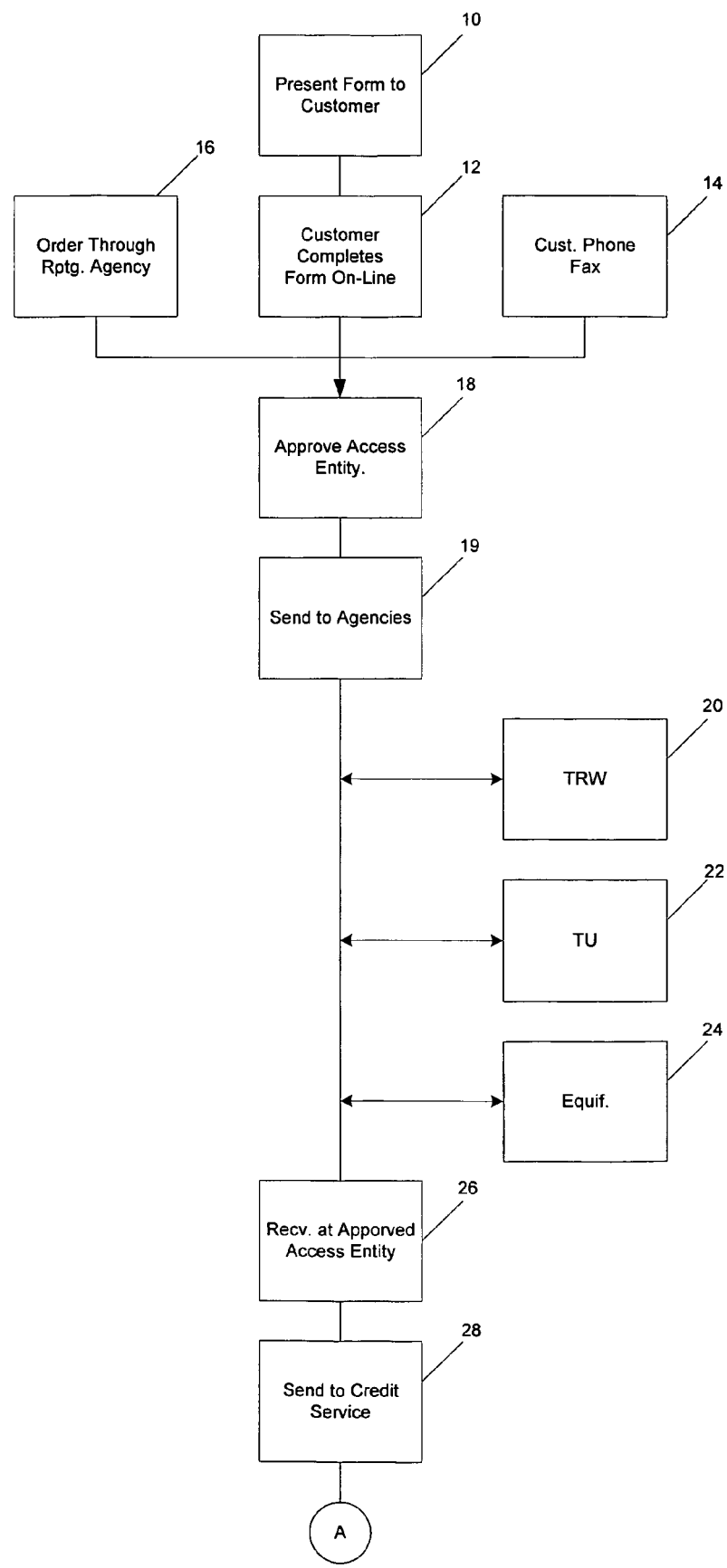
FIG. 1, illustrates the data flow of the present invention.

Referring to FIG. 1, the data flow of the present invention is illustrated. A customer signs onto the website of the present invention and receives a form for requesting credit information 10. The customer can complete the form in one of several ways. First, the customer can complete the form online 12 presenting all the required information.

Alternatively the customer can print out the form and send the form into the various credit bureaus by fax, or make a telephonic request 14 or can order the credit information through an appropriate affiliated credit reporting agency 16. When using the present invention however, the order for credit information is received by the server of the present invention 18 and, at the present time, electronically transmitted to an entity approved to access credit bureau databases whereupon, this approved entity 26 sends appropriate requests to the three credit reporting agencies TRW 20, Transunion 22, and Equifax 24. This "approved entity" currently exists but may possibly be eliminated in the future. The presence of this entity in the present invention is meant therefore as a limitation but only to reflect present day operations.

Credit information is then sent from the credit reporting agencies back to the approved entity 26 where the information is then sent to the server of the present invention 28.

At the credit server of the present invention several actions take place. First, the information is reviewed electronically and parsed into a narrative format that can be understood by normal customers. This operation takes the stilted and sometimes difficult to understand language of credit reports and automatically converts that information into readable narrative that the customer can understand. In addition to this narrative creation, the server of the present invention creates an electronic dispute form enabling the borrower to dispute the credit information.

Figure 2:
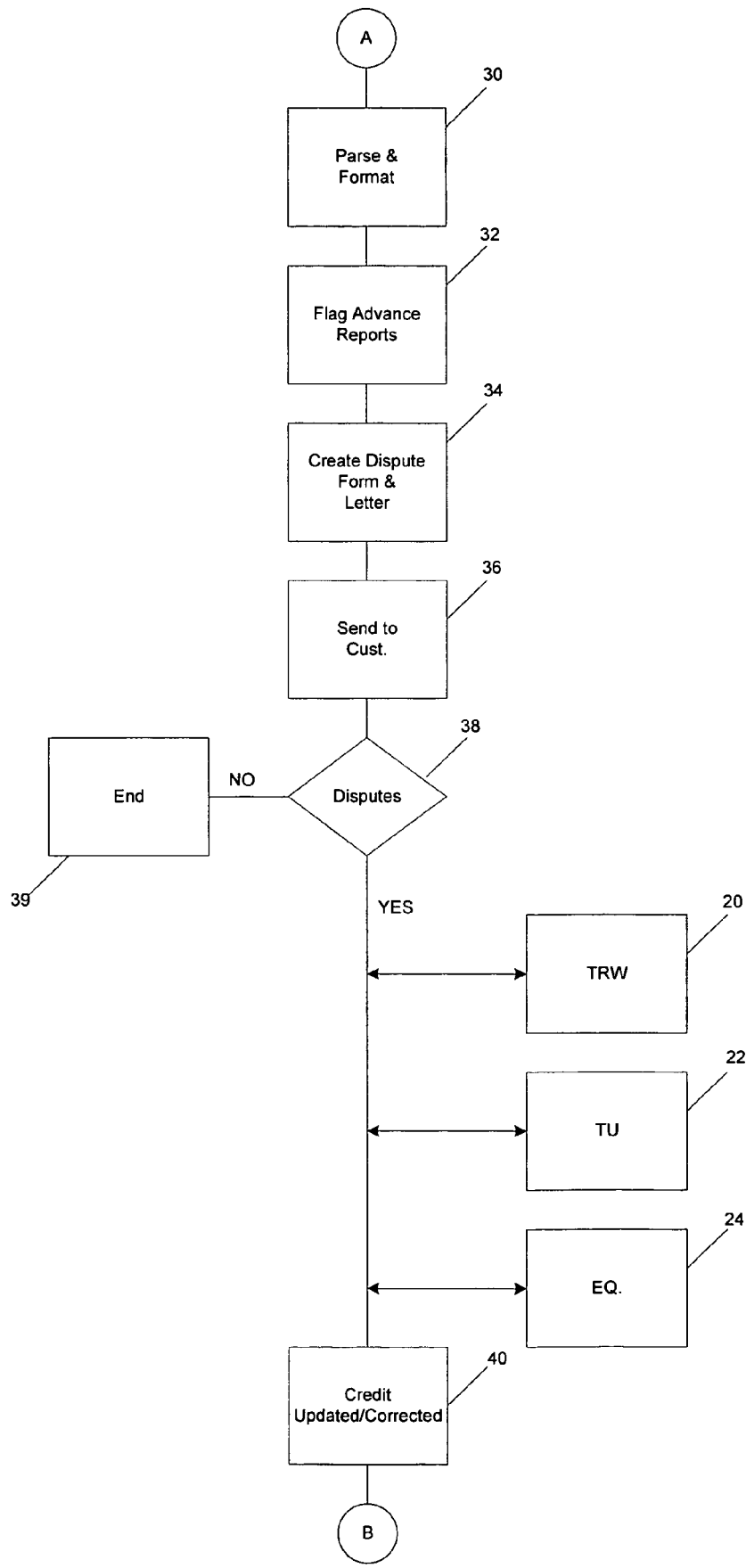
FIG. 2, illustrates a continuation of the data flow of the present invention

Referring to FIG. 2, the data flow of the present invention is continued. As noted above, information is parsed and formatted 30 in such a way that consumers can understand the information that is presented therein. Adverse information 32 is identified and a credit dispute form and an appropriate letter is created 34. Thereafter, the electronic credit dispute form and letter is sent to the customer 36.

Upon receipt of the merged credit report and the notations of adverse credit together with the electronic credit dispute form, the customer has the option of disputing 38 the credit items noted in the report. If the customer does dispute the credit reference, the customer has the option of checking any number of options in responding to the credit reference. This automatically creates the appropriate letter which is then sent to the three credit reporting bureaus 20, 22 and 24 for their own internal dispute resolution actions either electronically or by traditional means. Thereafter, updated and corrected credit reports are then sent to the customer 40.

The credit report of the present invention uses the data reported from the various credit bureaus. However, the credit report of the present invention is an interactive one. The customer has the option to sort the credit information in any desired manner. For example, the customer can request the system to sort by creditor name, credit bureau reporting, accounts with 30 day late payments, 60 day late payments, and in any other fashion desired by the customer.

Figure 3:
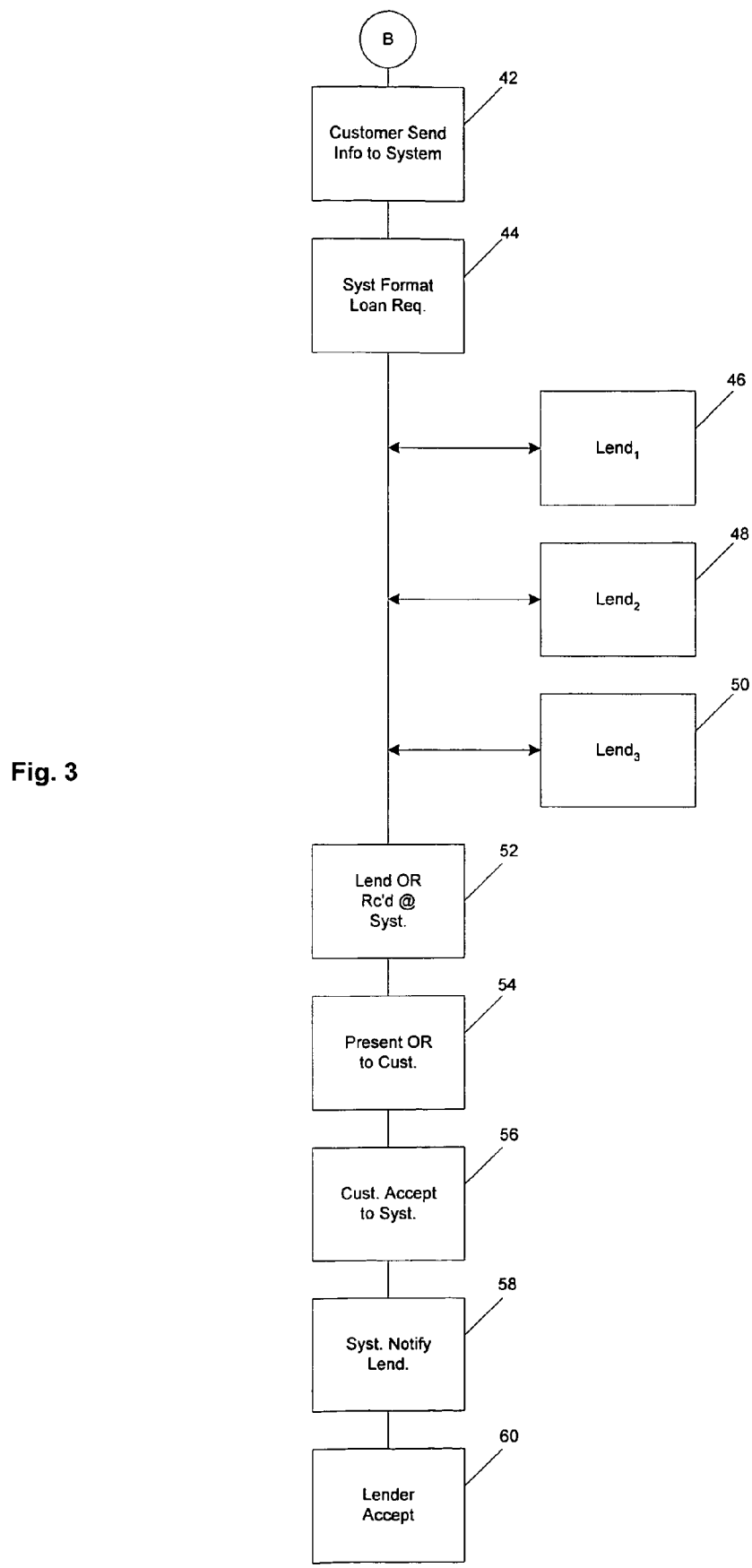
FIG. 3, illustrates a continuation of the data flow of the present invention.

Referring to FIG. 3, the data flow of the present invention continues. Once the customer receives the updated credit information from the credit bureau, the customer sends the information to the server of the present invention 42. Alternatively, if a broker or mortgage lender is involved, each may send the information to the server as well. The server already possesses information concerning the loan amounts desired by the customer. The server therefore takes the customer credit information, merges that with other credit terms desired by the customer, and prepares an appropriate offer 44. This offer is then sent by the server of the present invention to various lenders 46, 48 and 50 who then receive the information including credit information, background information, scanned documentation where required, and amount of money to be borrowed by the customer. The various lenders then respond to the offer with their own terms and conditions which may vary one from another. These various lender offers are then received by the server of the present invention 52.

The server accumulates offers from various lenders and, upon receipt of a certain number of offers, preferably 5, presents those offers to the customer 54. The customer can then review the various offers from various lenders and accept an offer 56 and communicate the acceptance of that offer to the server of the present invention 58. The acceptance of the offer is then communicated to the lender 60 whereupon the lender then creates the appropriate paperwork which is sent directly to the customer.

With the present invention, revenue is derived from a variety of sources. The entity that manages the server of the present invention derives revenue from the processing of the credit correction requests. Credit reports are charged at a certain amount to customers, which includes any costs associated with generating the letters and analysis which the customer then uses.

An entity that runs the server of the present invention also derives revenue from the various lenders who accept loans from particular customers. In this fashion the server of the present invention receives an origination fee from the lender that is the ultimate successful lender to the customer.

In this fashion the present invention serves the need to not only correct a credit reference of certain customers but allow the most cost effective loan to be presented to a customer for selection. Thus the customer saves money by receiving a variety of loan offers that can be accepted at the most favorable terms.

EXAMPLE

Following is an example of the credit correction procedure of the present invention.

Referring to FIG. 4, the login screen for access to the consumer's full credit report is illustrated. The consumer enters his social security number in box 400, and his pin number in box 401. The consumer also has the option of determining a display type from the Display Type pull down menu 402. Then the consumer logs in via the "Login" button 403.

Referring FIG. 5, the summary screen 500 for the consumer's entire credit report, and a browser menu 501 is illustrated. Within the browser menu, the consumer can choose whether to view the creditors' reports in Narrative or Traditional form, or both, via the "Display Type" pull down menu 502. The consumer can also choose to view the entire list of creditors, sorted by name, date, high balance, monthly payment, balance, date reported, bureaus, X30, X60 or X90, via the "Sort by" pull down menu 503; or can choose to view an individual creditor's report via the "Jump to" pull down menu 504. The consumer then selects the "Go" button 505. As noted earlier, the "Traditional form" may be incomprehensible to many consumers. Hence, the system of the present invention also converts credit reports to a narrative form that can be better and more easily understood.

Selecting the "Next" button 506 brings up the first listed individual creditor report. "Display Credit Report" 507 will automatically display the entire list of creditors sorted according to the "Sort by" selection. Selecting the "Create/View Letters" button 508 allows the consumer to view or create letters to creditors.

Referring to FIG. 6, the summary screen 600 for an individual creditor's report displayed in both Narrative and Traditional formats, and a browser menu 601 is illustrated. Under the "Click and Correct" section of the summary screen, the consumer has the option of choosing to dispute or not dispute the credit report information by selecting the appropriate "radio" button 610. Under the "Nature of Dispute" section of the summary screen, the consumer who disputes the credit report information can choose one of six possible bases for the dispute by clicking on the appropriate "radio" button 611. The consumer may also provide a written explanation of the dispute in the text box 612 at the bottom of the summary screen.

In addition to browsing the preceding and succeeding screens by selecting the "Previous" 609 or "Next" 606 buttons, the consumer may select the "Jump to" pull down menu to choose another individual creditor's report 604 and press "Go" 605. He may also view the entire credit report summary via the "Display Credit Report" button 607, sorted by name, date, high balance, monthly payment, balance, date reported, bureaus, X30, X60 or X90 via the "Sort by" pull down menu 603. The chosen reports may be viewed in Narrative or Traditional formats by selecting the "Display Type" pull down menu 602.

If the consumer wants to prepare a letter to a creditor which incorporates the information entered in the summary screen for each disputed credit report, the consumer selects the "Create/View Letters" button 608 to automatically generate a dispute letter to a creditor and the appropriate credit reporting bureau.

Referring to FIG. 7, a sample generated letter is illustrated.

The equipment that gives rise to the present invention comprises standard hardware such as that generally owned by consumers. For example, IBM PCs, Macintosh computers, and the like which are typical of the type used by consumers for interaction over the internet are completely appropriate for the present invention. The server of the present invention can be an Intel Pentium class processor or server such as those offered by Sun Microsystems and the like. The internet is the preferable network for use by the present invention. However, this is not meant as a limitation. Private networks are also equally suitable for the presentation of information and communication between the credit bureaus and the server of the present invention. Further, a computer at the customers location is not meant as a limitation. For example, a customer not possessing a personal computer can go to a more centralized location such as a loan origination office and convey the information necessary to utilize the present invention as well.

A system and method for correcting erroneous and/or inaccurate credit references and loan application has been illustrated. It will be appreciated by those skilled in the art that other embodiments of the present invention are possible without departing from the scope of the invention as disclosed.

We claim:

1. A method for loan application and credit correction comprising:

assembling and scanning supporting documents from a borrower for a loan to create an electronic copy of the supporting documents;

completing an electronic loan application form on a loan application terminal, the loan application terminal connected to a loan application server;

requesting a credit report via the loan application terminal;

receiving the credit report comprising credit references and parsing the credit references in a user-configurable manner;

creating a loan package comprising the electronic loan form, the credit report, and the electronic copy of the supporting documents; and submitting the loan package electronically to a plurality of lenders;

further comprising:

the borrower deciding to dispute a credit reference;

the borrower designating electronically those credit references to be disputed;

the borrower designating to the loan application server electronically the reason for disputing the credit reference; and the loan application server automatically generating a dispute communication relating to the credit reference.

2. The method for loan application and credit correction of claim 1 further comprising, receiving electronic offers from the plurality of lenders at the loan application terminal; and electronically submitting the offers to the borrower for selection.

3. The method for loan application and credit correction of claim 1 further comprising:

the loan application server adding any response to the dispute communication to the loan package; and the server submitting the loan package to said plurality of lenders for review.

4. A method for reviewing credit information and automatically generating a dispute communication comprising:

a borrower or broker requesting credit information from at least one credit bureau;

receiving credit information electronically from the at least one credit bureau;

parsing the credit information into categories in a database;

configuring the credit information in the database according to user definable parameters;

the borrower deciding to dispute a credit reference;

the borrower or broker designating electronically those credit references to be disputed;

the borrower or broker designating electronically the reason for disputing the credit reference; and automatically generating a dispute communication relating to the credit reference.

5. A system for loan application and credit correction comprising:

a loan application terminal comprising a loan application form to be completed by a borrower and further comprising an electronic request form for requesting credit bureau information about the borrower;

a network connected to the loan application terminal;

a loan application server connected to the loan application terminal over the network for receiving the loan application form and the request for credit information;

the server further comprising instructions for requesting the credit information electronically from at least one credit bureau and receiving the credit information over the network;

the server further comprises instructions for parsing the received credit information into a database and for displaying the parsed credit information according to user-definable parameters;

the server further comprises instructions for permitting the borrower to identify credit references of interest;

the server further comprises instructions for allowing the borrower to designate those credit references that the borrower wishes to dispute;

the server further comprises instructions for presenting to the borrower options for explaining and disputing the inaccurate credit references, and for automatically generating a communication to an appropriate credit bureau based upon the dispute option selected by the borrower; and the server further comprising instructions for assembling the loan application form together with the credit information to form a loan package and for submitting the loan package to a plurality of lenders over the network.

6. The system for loan application and credit correction of claim 5 wherein the server further comprises instructions for receiving offers from lenders desiring to lend money to the borrower and for conveying the offers from the lenders to the borrower.

7. The system for loan application and credit correction of claim 5 wherein the server further comprises instructions for parsing the received credit information into a database and for displaying the parsed credit information according to user-definable parameters.

8. The system for loan application and credit correction of claim 5 wherein the server further comprises instructions for displaying to a said borrower a narrative version of the received credit information.

9. The system for loan application and credit correction of claim 5 wherein the network is the internet.

10. The system for loan application and credit correction of claim 5 wherein the network is a wireless network.

11. The system for loan application and credit correction of claim 5 wherein the network is an intranet.

12. A system for reviewing credit information and automatically generating a dispute communication comprising:

a computer terminal comprising means to input a request for credit information about a borrower;

a network connected to the computer terminal;

a server connected to the computer terminal over the network for receiving the request for credit information;

the server further comprising instructions for requesting the credit information electronically from at least one credit bureau and receiving the credit information over the network;

the server further comprises instructions for parsing the received credit information into a database and for displaying the parsed credit information according to user-definable parameters;

the server further comprises instructions for permitting the borrower to identify credit references of interest;

the server further comprises instructions for allowing the borrower to designate those credit references that the borrower wishes to dispute; and the server further comprises instructions for presenting to the borrower options for explaining and disputing the inaccurate credit references, and for automatically generating a communication to the credit bureau based upon the dispute option selected by the borrower.

13. The system of claim 12 wherein the network is selected from the group consisting of the internet, a wireless network, and an intranet.

14. The system of claim 12 wherein the server further comprises instructions for parsing the received credit information into said database and for displaying the parsed credit information according to user-definable parameters.

15. The system of claim 12 wherein the server further comprises instructions for displaying to said borrower a narrative version of the received credit information.

16. The method of claim 4 further comprising the borrower or broker requesting credit information from a plurality of credit bureaus.

17. A method for reviewing credit information and automatically generating a dispute communication comprising:
    a borrower or broker requesting credit information from at least one credit bureau;
    receiving credit information electronically from the at least one credit bureau;
    the borrower deciding to dispute a credit reference;
    the borrower or broker designating electronically those credit references to be disputed;
    the borrower or broker designating electronically the reason for disputing the credit reference; and
    automatically generating a dispute communication relating to the credit reference.

18. A system for reviewing credit information and automatically generating a dispute communication comprising:
    a computer terminal comprising means to input a request for credit information about a borrower;
    a network connected to the computer terminal;
    a server connected to the computer terminal over the network for receiving the request for credit information;
    the server further comprising instructions for requesting the credit information electronically from at least one credit bureau and receiving the credit information over the network;
    the server further comprises instructions for allowing the borrower to designate those credit references that the borrower wishes to dispute; and
    the server further comprises instructions for presenting to the borrower options for explaining and disputing the inaccurate credit references, and for automatically generating a communication to the credit bureau based upon the dispute option selected by the borrower.

* * * * *